US006101910A

United States Patent [19]

Nicolai et al.

[11] Patent Number: 6,101,910

[45] Date of Patent: Aug. 15, 2000

[54] APPARATUS FOR CUTTING TUBES

[75] Inventors: Günther Nicolai, Dettingen; Ralf Arnold, Metzingen-Neuh., both of Germany

[73] Assignee: Adolf Brodbeck Maschinenbau GmbH & Co., Germany

[21] Appl. No.: 08/787,533

[22] Filed: Jan. 21, 1997

[30] Foreign Application Priority Data

Jan. 26, 1996 [DE] Germany ........................... 196 02 730

[51] Int. Cl.[7] ........................................................ B23B 5/14

[52] U.S. Cl. .................................. 82/101; 82/113; 82/138

[58] Field of Search .............................. 82/101, 113, 138, 82/46, 48, 54, 55, 56, 59, 66, 70.1, 70.2, 97, 100; 408/79, 80; 407/119

[56] References Cited

U.S. PATENT DOCUMENTS

| | | | |
|---|---|---|---|
| 4,302,958 | 12/1981 | Andriessen et al. | 82/95 X |
| 4,437,366 | 3/1984 | Astle | 82/113 |
| 5,383,380 | 1/1995 | Sartori | 82/96 X |
| 5,543,210 | 8/1996 | Kullander et al. | 407/119 X |
| 5,555,783 | 9/1996 | Pienta | 82/101 X |

*Primary Examiner*—Andrea L. Pitts
*Assistant Examiner*—Henry W. H. Tsai

[57] ABSTRACT

An apparatus for cutting tubes has at least one cutting tool that contacts an anvil of a counterstay. The anvil is arranged relative to a cutting point of the cutting tool within the interior of a tube. The cutting tool can be fed in towards the counterstay during the cutting operation and can be limited in its cutting movement by the counterstay at the end of the cutting operation. The anvil is arranged in a yielding manner in the counterstay in the infeed direction of the cutting tool.

24 Claims, 2 Drawing Sheets

APPARATUS FOR CUTTING TUBES

BACKGROUND OF THE INVENTION

1. Field of the Invention

This invention relates to an apparatus for cutting tubes, and more particularly, to an apparatus for cutting cardboard tubes, which apparatus employs a cutting tool that runs against an anvil.

2. Discussion of Prior Art

Apparatus for cutting tubes, in particular, cardboard tubes, have been disclosed, in which a mandrel having at least one anvil can be positioned in the tube relative to the cutting point. The apparatus has a stationary cutting blade that cuts tubes to a preset length. The tubes are guided and rotate on the mandrel. The cutting tool performs a preset cutting travel. In the course of that travel, the infeed movement can be limited by the cutting tool running against the anvil.

Because the cutting tool (cutting blade) has a thin and sensitive cutting edge, the cutting tool can be damaged at the end of the cutting movement. This damage to the cutting tool is caused by the cutting edge coming to bear against the cutting surface of the anvil under the force of the infeed movement, causing the cutting tool to become blunt. Therefore, it is necessary to change the cutting blade frequently, after a short operating period. This results in high assembly and tool costs. Furthermore, inadequate work results are achieved in subsequent cutting operations because tubes cut with blunted cutting blades that do not finish the cutting movement completely and may not be cut in the appropriate location.

SUMMARY OF THE INVENTION

The object of the invention is to provide an apparatus for cutting tubes that produces a neatly cut tube surface and a cutting blade that lasts longer than blades of the prior art. This object is achieved, according to the invention, by an apparatus for cutting tubes having a counterstay, at least one anvil associated with the counterstay, and at least one cutting tool arranged to run against the anvil. The anvil is arranged within the tube and relative to a cutting point of the cutting tool. The cutting tool is arranged to be fed in towards the counterstay during a cutting operation and is limited in its cutting movement by the counterstay at the end of the cutting operation. The anvil is arranged in the counterstay in a yielding manner in the feed in direction of the cutting tool.

The yielding configuration of the anvil in the counterstay in the infeed direction of the cutting tool enables the anvil to yield in the cutting direction at the end of the cutting operation immediately before the tube section is cut off. As a result, the cutting blade does not run with the full cutting force against a fixed mating surface, which limits the movement of the cutting blade. This arrangement protects the cutting tool (cutting blade) from being weakened or becoming blunt because the cutting tool has run against the anvil, even when the depth setting of the cutting tool is not accurate. Thus, the configuration according to the present invention of a yielding anvil allows a greater tolerance in the depth setting of the cutting blade.

Damage to the cutting blade can thereby be avoided at a cutting depth set between minimum and maximum values. This is especially advantageous when there are different operators setting the apparatus during a multi-shift plant operation. Hence, the life expectancy of the cutting tool is increased even if individual operators have different sensitivities for the particular feel of setting the depth of the cutting blade.

A particular advantage of a further embodiment of the invention is that provision is made for the anvil to be guided in a yielding manner as a function of the cutting depth of the cutting blade, accomplished by an actuator arranged in the counterstay. Active movement of the anvil during the cutting operation is thereby provided, so that the anvil is actively guided to the inside of the tube being cut or relative to the longitudinal center axis of the tube as a function of the cutting depth. A controlled cutting movement can thereby be effected. During the course of the cutting movement, the cutting blade comes to bear precisely against the anvils surface as a function of the setting accuracy when the preset cutting depth is reached. The service life of the cutting blade and the anvil is thereby substantially increased.

BRIEF DESCRIPTION OF THE DRAWINGS

Preferred embodiments of the invention will now be described, taken together with the drawings, in which.

DETAILED DESCRIPTION OF PREFERRED EMBODIMENTS

Figure 1:
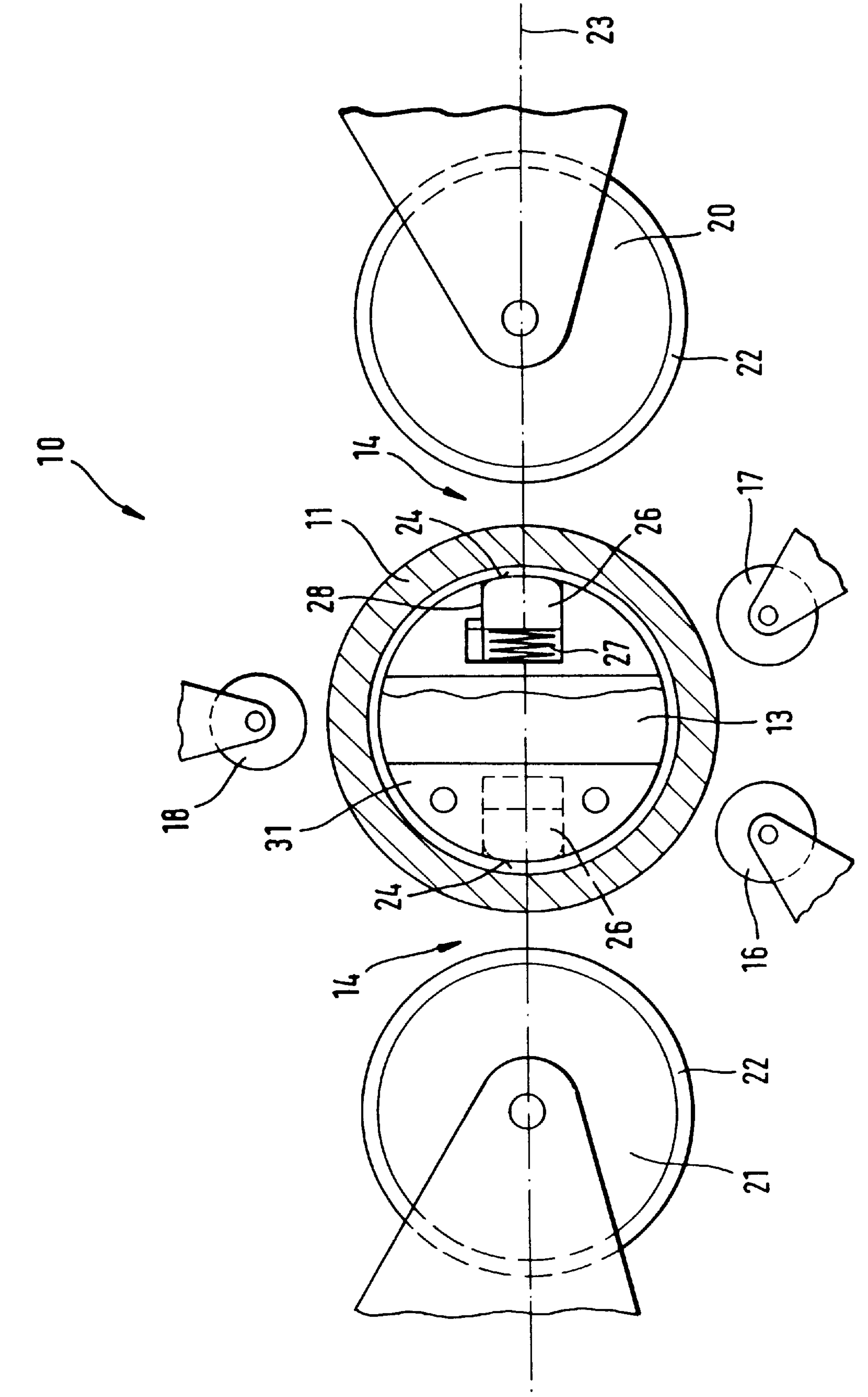
FIG. 1 is a schematic representation of a tube shown in the cutting plane and with a counterstay arranged relative to the cutting point.

FIG. 1 shows the apparatus (10) according to the invention for cutting tubes (11), such as cardboard tubes or plastic tubes. Cardboard tubes having a diameter in the decimeter or lower meter range, preferably in the range of between 25 and 340 mm., and having a wall thickness of, for example, up to 20 mm., can be cut off to a preset length by apparatus according to the invention. The tubes (11) are fed on a feed device to a counterstay (13). The tubes (11) then travel over the counterstay (13) until the length of the tube (11) to be cut off has reached the cutting point. Supporting rollers (16, 17, 18) support the tube during the cutting operation. During the cutting operation, the tube (11) is set in rotation via drive means (not shown) and a right hand and left hand cutting tool (20, 21) designed as disc-shaped cutting blades are moved towards the longitudinal center axis of the tube (11), so that the cutting edges (22) of the cutting tools (20, 21) come into engagement with the rotating tube (11) at a cutting point (14) and sever the tube. The cutting blades (20, 21) are advantageously arranged offset 180 degrees from one another, so that there is a uniform distribution of the cutting forces exerted over the tube (11) during the cutting operation. The cutting tools (blades) (20, 21) are fed in along the axis (23) until the cutting tools (20, 21) bear on the end face (24) of the anvil (26). The cut is completed or the infeed of the cutting tool (20, 21) is stopped when the free end of the tube falls away from the tube section set in rotation.

The anvil (26) is guided in a yielding manner radially to the longitudinal center axis of the tube (11) by a compression element (27) in a guide (28) in the counterstay (13). The anvil (26) can be limited in its radial movement to the outside by, for example, a stop arranged in the guide (28). Alternatively, provision may be made for a recess in the circumference of the counterstay (13) that is designed so that only part of the end face (24) comes to bear at the circumference of the counterstay (13). For simple manufacture and assembly, a cover plate (31) is screwed laterally to the counterstay (13) after the anvil (26) and the compression element (27) are inserted. The cover plate (31) is in the form of a circular segment.

The compression element (27) may be designed, for example, as a compression-spring or a disc-spring assembly. The compression element (27) has a compressive force that is less than the infeed force of the cutting tool (20, 21), so that when the cutting edge (22) of the cutting tool (20, 21) strikes the end face (24) of the anvil (26), the anvil can yield in the guide (28). This can result in a considerable advantage when setting the guide depth of the cutting tool (20, 21). Furthermore, due to this yielding configuration, the sensitive cutting edge (22) can be protected from damage, so that the service life of the cutting edge may be increased.

Alternatively, an elastomeric or thermoplastic material can be used as the compression element (27). The compression biased travel of the anvil can be up to 5 mm.; a yielding range of, for example, 1 mm. is generally sufficient.

During the cutting operation, the cutting tools (20, 21) are in a stationary position, so that the same portion of the cutting edge (22) always comes into engagement as tubes (11) are repeatedly cut-off. In order to use the fully encircling cutting edge (22), cutting tools (20, 21) are rotated by a certain angle after a predetermined number of cutting operations, so that a new and unused cutting edge (22) comes into position for cutting. Such indexing may be effected manually or automatically, and may be effected after every cut, at intervals, or as required.

The cutting tools (20, 21) are advantageously made of HSS, carbide or other materials suitable for a cutting tool. The cutting edge (22) may have a coating to increase the service life of the cutting edge, such as, for example, a polycrystalline diamond coating or a cubic boron nitride coating. Other coatings may be used, as well.

Alternatively, a kinematic reversal may be provided for cutting the tubes (11) to length. In this reverse arrangement, the cutting tools (20, 21) rotate around the tube (11) and are arranged in stationary positions on their bearing axes. The anvils (26) are rotationally driven at the same time that the cutting tools (20, 21) rotate around the tube (11). Thus, the anvils (26) and the cutting tools (20, 21), as viewed in the moving system, are arranged in a stationary position relative to one another.

Alternatively, the tube (11) may be arranged in a stationary position, and the cutting tools (20, 21) may be rotationally driven in order to cut off a tube length.

Alternatively, provision may be made for only one cutting tool or for a plurality of cutting tools distributed over the periphery of the tube (11). In this arrangement, a number of anvils (26) would be provided in the counterstay (13) equal to the number of cutting tools (20, 21).

Figure 2:
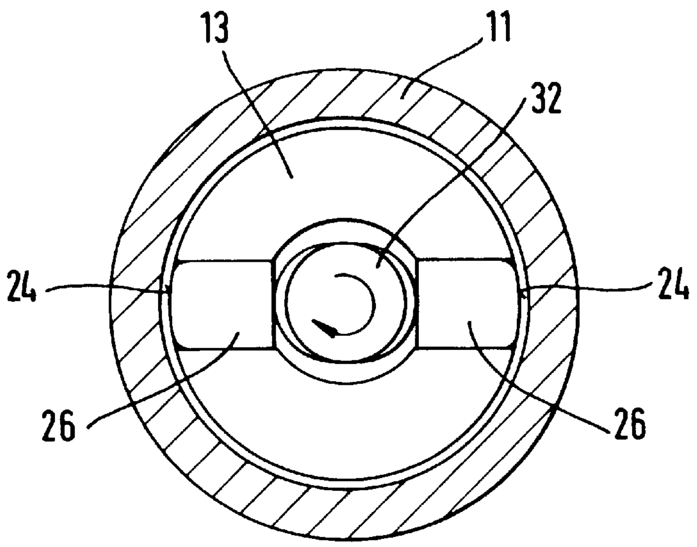
FIG. 2 is a second embodiment of the invention showing anvils guided in a counterstay.

FIG. 2 shows another preferred embodiment of the invention having two anvils (26) guided in a counterstay (13). Via an actuator (32), designed as a link or a cam control mechanism, the anvils (26) are actively moved in relation to the cutting depth of the cutting tools (20, 21) so that the anvils (26) perform a defined inward radial movement towards the end of the cutting operation, so that the cutting tools (20, 21) cut just a final portion of the cardboard tubes but do not come to bear with high force on the end faces (24) of the anvils. The active movement of the anvils (26) is determined by a cam control mechanism. The anvils (26) have compression elements in their respective guides (28) that move the anvils (26) radially inwards in a positive manner. Positive outward deflection can be provided by rotary movement of the actuator (32). The actuator (32) may be activated during the cutting operation via a shaft connected to an infeed mechanism of the cutting tools (20, 21).

Figure 3:
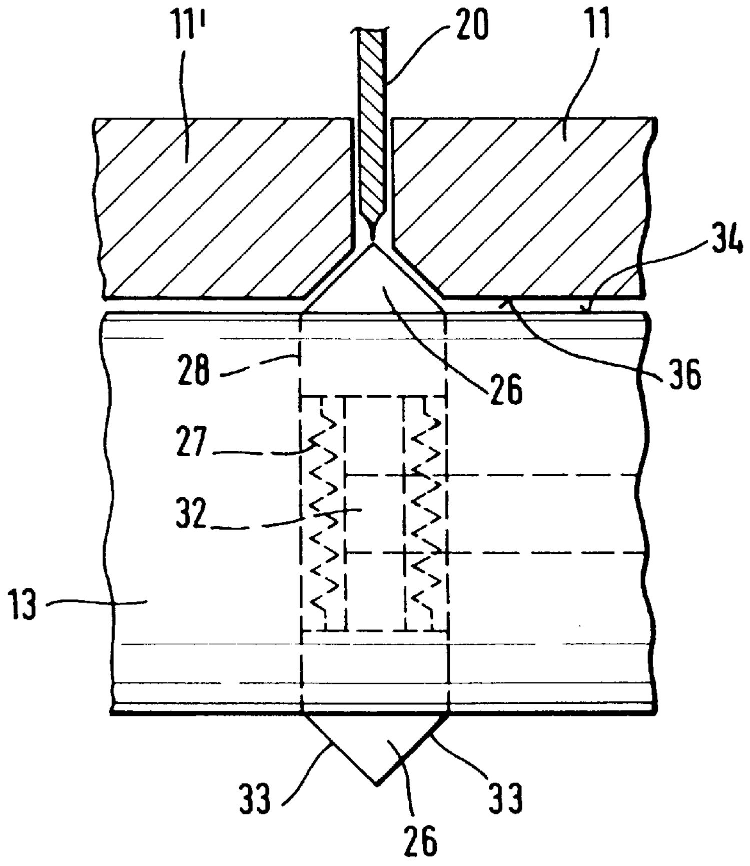
FIG. 3 is a schematic view of a third embodiment of the invention.

FIG. 3 shows another preferred embodiment of the present invention, which is an alternative embodiment to FIG. 2. In FIG. 3, the anvil (26) is of conical design and projects with its sloping surfaces (33) beyond the circumference (34) of the counterstay (13). A bevel is thereby provided at the cutting point on the inside of the tubes (11, 11'). In the case of cardboard tubes, for example, the conical design enables the last portion of the tube (11) to be cut off in a more precise and neater manner. On the whole, this embodiment provides a neater cut edge with a simultaneous bevel and a defined inner edge of the tube (11). Further processing of the tubes is thereby made easier.

At the beginning of the cutting operation, the anvils (26) are moved outwards via the positive guide of the actuator (32), so that the anvils are pressed at least partly into the inner circumference of the tube (11). Cutting tools (20, 21) are moved radially inwards from outside the tube (11) towards the anvils (26). The anvils (26) are guided on the axis (23) towards the cutting point (14). The cutting tools (20, 21) can then be positioned on the common axis (23) relative to the anvils (26). Alternatively, at least a slight active inward movement of the anvils (26) can be effected just before the anvils (26) and the cutting tools (20) bear against one another.

To permit travel over the counterstay (13) and to fix the next length of the tube section, the anvils (26) may be moved inwards via the actuator (32) in such a way that the outer edges of the anvils (26) are positioned within the circumference (34) of the counterstay (13). Once the length of the tube (11) is set, and the tube (11) has been set in rotation, the anvils (26) can be moved outward via the actuator (32) at the beginning of the cutting operation.

We claim:

1. An apparatus for cutting tubes, comprising:

a counterstay (13), at least one anvil (26) associated with said counterstay (13), at least one cutting tool (20, 21) arranged to run against said anvil (26), wherein:

said anvil (26) is arranged within said tube (11) opposite to a cutting point (14) of said cutting tool (20, 21), said at least one cutting tool (20, 21) is arranged to be fed in towards said counterstay (13) during a cutting operation and is limited in said fed in cutting movement by said anvil (26) at the end of said cutting operation, said anvil (26) is arranged in said counterstay (13) in a yielding manner in said fed in direction of said cutting tool (21, 21), and said anvil (26) is arranged with its end face (24) at least partly outside the circumference of said counterstay (13).

2. The apparatus according to claim 1, further comprising at least one compression element (27) in a guide (28) for elastically mounting said anvil (26) in said guide (28).

3. The apparatus according to claim 1, further comprising plastic elements in a guide (28) for mounting said anvil (26) in a yielding manner in said guide (28).

4. The apparatus according to claim 1, further comprising an actuator (32) arranged in said counterstay (13) for moving said anvil (26) in a yielding manner in a guide (28) in relation to the cutting depth of said cutting tool (20, 21).

5. The apparatus according to claim 4, wherein said actuator (32) comprises a cam plate arranged to rotate in said counterstay (13).

6. The apparatus according to claim 4, further comprising at least one compression element (27) arranged in a guide (28) for said anvil (26) for counteracting deflection movement of said actuator (32).

7. The apparatus according to claim 1, wherein said anvil (26) is of conical form.

8. The apparatus according to claim 1, wherein said anvil (26) is arranged to have a compression biased travel within said counterstay (13) of up to 5 mm.

9. The apparatus according to claim 1, wherein said cutting tool (20, 21) comprises a disc-shaped cutting blade.

10. The apparatus according to claim 1, wherein said cutting tool (20, 21) is in a non-rotating position during said cutting operation.

11. The apparatus according to claim 1, wherein said cutting tool (20, 21) is arranged to be indexed by a few angular degrees.

12. The apparatus according to claim 1, wherein said cutting tool (20, 21) is comprised of carbide or HSS.

13. The apparatus according to claim 1, wherein said cutting tool (20, 21) has a diamond coating.

14. The apparatus according to claim 1, wherein said cutting tool (20, 21) has a coating of cubic boron nitride.

15. The apparatus according to claim 1, wherein said anvil (26) is movable in a guide (28) arranged radially relative to a longitudinal center axis of said counterstay.

16. The apparatus according to claim 1, wherein said anvil (26) is arranged in a guide (28) with an end face (24) of said anvil (26) pointing towards said cutting tool (20, 21), said end face (24) having a surface substantially corresponding to the circumference (34) of said counterstay (13).

17. The apparatus according to claim 1, wherein said counterstay (13) includes a guide (28) in a form of a groove-shaped recess, further comprising a cover plate (31) for closing over said groove-shaped recess.

18. The apparatus according to claim 1, wherein said counterstay (13) has a guide (28) for said anvil (26) with an opening formed in the circumference (34) of said counterstay (13), wherein said opening is smaller than an end face (24) of said anvil (26) and secures said anvil (26) in its radical outside position.

19. The apparatus according to claim 1, wherein said counterstay (13) has a guide (28) with an undercut and said anvil (26) interacts with said undercut to be secured against radial release.

20. The apparatus according to claim 1, wherein said anvil (26) is arranged to be set in a radial position relative to the circumference (34) of said counterstay (13).

21. The apparatus according to claim 1, wherein said counterstay (13) is arranged to be inserted in the tubes (11) having an inside diameter of at least 10 mm.

22. The appartus according to claim 1, wherein said cutting tool (20, 21) is arranged to be indexed after every cut, at intervals, or as required.

23. The apparatus according to claim 1, further comprising two cutting tools (20, 21) offset 180 degrees relative to one another on a common axis (23).

24. The apparatus according to claim 1, further comprising a plurality of cutting tools (20, 21) uniformly distributed about the periphery of said counterstay (13).

* * * * *